United States Patent
Diamant

(10) Patent No.: US 7,721,013 B2
(45) Date of Patent: May 18, 2010

(54) COMMUNICATING GRAPHICS DATA VIA AN OUT OF BAND CHANNEL

(75) Inventor: Nimrod Diamant, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 11/804,836

(22) Filed: May 21, 2007

(65) Prior Publication Data

US 2008/0294800 A1 Nov. 27, 2008

(51) Int. Cl.
*G06F 3/00* (2006.01)
*G06F 13/00* (2006.01)

(52) U.S. Cl. .............................. 710/8; 710/15; 710/22; 710/36

(58) Field of Classification Search ........................ None
See application file for complete search history.

(56) References Cited

U.S. PATENT DOCUMENTS

| | | | |
|---|---|---|---|
| 4,539,655 A | 9/1985 | Trussell et al. | |
| 4,792,896 A | 12/1988 | Maclean et al. | |
| 5,581,715 A | 12/1996 | Verinsky et al. | |
| 5,812,820 A | 9/1998 | Loram | |
| 5,889,965 A | 3/1999 | Wallach et al. | |
| 6,530,050 B1 | 3/2003 | Mergard | |
| 6,606,164 B1 | 8/2003 | Irie et al. | |
| 6,826,387 B1 | 11/2004 | Kammer | |
| 6,834,326 B1 | 12/2004 | Wang et al. | |
| 6,881,096 B2 | 4/2005 | Brown et al. | |
| 7,043,205 B1 | 5/2006 | Caddes et al. | |
| 7,155,512 B2 | 12/2006 | Lean et al. | |
| 7,457,847 B2 | 11/2008 | Ramey | |
| 2002/0054029 A1* | 5/2002 | Glancy et al. ................ 345/173 |
| 2003/0061401 A1 | 3/2003 | Luciani, Jr. | |
| 2003/0105850 A1 | 6/2003 | Lean et al. | |
| 2003/0194908 A1 | 10/2003 | Brown et al. | |
| 2003/0229727 A1 | 12/2003 | Wang | |
| 2004/0128412 A1 | 7/2004 | Harrison | |
| 2004/0177264 A1* | 9/2004 | Anson et al. ................ 713/200 |
| 2004/0181590 A1* | 9/2004 | Liou et al. .................. 709/217 |
| 2004/0249985 A1 | 12/2004 | Mori et al. | |
| 2005/0015430 A1* | 1/2005 | Rothman et al. ............ 709/201 |
| 2006/0149860 A1 | 7/2006 | Diamant | |
| 2006/0168099 A1 | 7/2006 | Diamant | |
| 2007/0005821 A1 | 1/2007 | Diamant | |
| 2007/0005828 A1 | 1/2007 | Diamant ..................... 710/48 |

(Continued)

OTHER PUBLICATIONS

"IPMI-Intelligent Platform Management Interface Specification Second Generation v2.0", Table of Contents; Document Revision 1.0, Feb. 12, 2004, 23 pages.

(Continued)

*Primary Examiner*—Ilwoo Park
*Assistant Examiner*—Scott Sun

(57) ABSTRACT

In one embodiment, the present invention includes a method for providing a command from a keyboard, video and mouse (KVM) system of a first system to a graphics card of the first system via an existing system interface, sampling data from a frame buffer of the graphics card and providing the sampled data to a sample buffer of the KVM system, and processing the sampled data in the KVM system. Also, data to be displayed at a graphics card may be sent as out-of-band (OOB) data from the KVM system. Other embodiments are described and claimed.

15 Claims, 3 Drawing Sheets

U.S. PATENT DOCUMENTS

2007/0005867 A1     1/2007    Diamant
2007/0116110 A1     5/2007    Diamant et al.

OTHER PUBLICATIONS

Office Action received for U.S. Appl. No. 11/027,917, mailed on Sep. 4, 2008, 16 pages.
Response to Office Action received for U.S. Appl. No. 11/027,917, filed Jan. 5, 2009, 19 pages.
Office Action received for U.S. Appl. No. 11/027,917, mailed on Apr. 15, 2009, 23 pages.
Response to Office Action received for U.S. Appl. No. 11/027,917, filed on Jun. 12, 2009, 15 pages.
Office Action received for U.S. Appl. No. 11/027, 917, mailed on Aug. 31, 2009, 13 pages.
Response to Office Action received for U.S. Appl. No. 11/027,917, filed on Oct. 9, 2009, 13 pages.
Microsoft, "Virtual PC 2004 Evaluation Guide", Nov. 2003, pp. 1-20.
Office Action received for U.S. Appl. No. 11/027,754, mailed on Aug. 8, 2007, 24 pages.
Response to Office Action received for U.S. Appl. No. 11/027,754, filed on Jan. 31, 2008, 42 pages.
Office Action received for U.S. Appl. No. 11/027,754, mailed on May 8, 2008, 26 pages.
Response to Office Action received for U.S. Appl. No. 11/027,754, filed on Jun. 17, 2008, 10 pages.
Office Action received for U.S. Appl. No. 11/027,754, mailed Dec. 9, 2008, 9 pages.
Response to Office Action received for U.S. Appl. No. 11/027, 754, filed on Mar. 9, 2009, 25 pages.
Office Action received for U.S. Appl. No. 11/027,754, mailed on Jun. 2, 2009, 9 pages.
Response to Office Action received for U.S. Appl. No. 11/027,754, filed on Jun. 24, 2009, 16 pages.

* cited by examiner

COMMUNICATING GRAPHICS DATA VIA AN OUT OF BAND CHANNEL

BACKGROUND

KVM (keyboard, video and mouse) is a technology that allows remote control of a managed machine from another terminal or personal computer (PC). There are analog KVM switches that connect a remote terminal, keyboard and mouse (herein a remote console) to one of several PCs such that the KVM signals are switched and a single PC is controlled at a given time. Such switches are typically analog switches and are limited in the distance between the managed machine, and the console typically includes a graphics screen.

Another technology that allows a remote control from a larger distance is KVM over internet protocol (IP), also referred to as KVM redirection. This technology samples the analog signals of the screen into a frame buffer and relays the compressed frame buffer to a remote console where viewer software shows the captured screen content. Similarly, keyboard and mouse controls are sent through the network to the managed machine. The KVM hardware includes an analog-to-digital (A/D) converter if it supports analog video sampling or includes a serial digital output capture circuit.

In order to connect to the external graphics card's output signals as described above, a special connector or wiring has to be connected, and special input analog pins at the KVM system have to be added. Sometimes if the KVM system does not support analog signals, an external A/D chip has to be added to the solution, increasing cost and complexity.

DETAILED DESCRIPTION

In various embodiments, a KVM system can communicate directly with a graphics subsystem such as an external graphics card to provide commands and/or data thereto using existing platform interfaces, avoiding the need for additional analog or digital pins or additional analog circuitry such as an analog-to-digital converter (ADC) to obtain sampled graphics data output by the graphics subsystem. In some implementations, commands may be provided from the KVM system using out-of-band (OOB) signaling via a given communication protocol, such as a Peripheral Component Interconnect Express (PCI Express™ (PCIe™)) protocol in accordance with links based on the PCI Express™ Specification Base Specification version 1.1 (published Mar. 28, 2005) (hereafter the PCIe™ Specification), or another such protocol. Thus KVM redirection may be performed without the need of A/D conversion and without the need for additional connectors or pins, reducing costs for providing KVM support.

Figure 1:
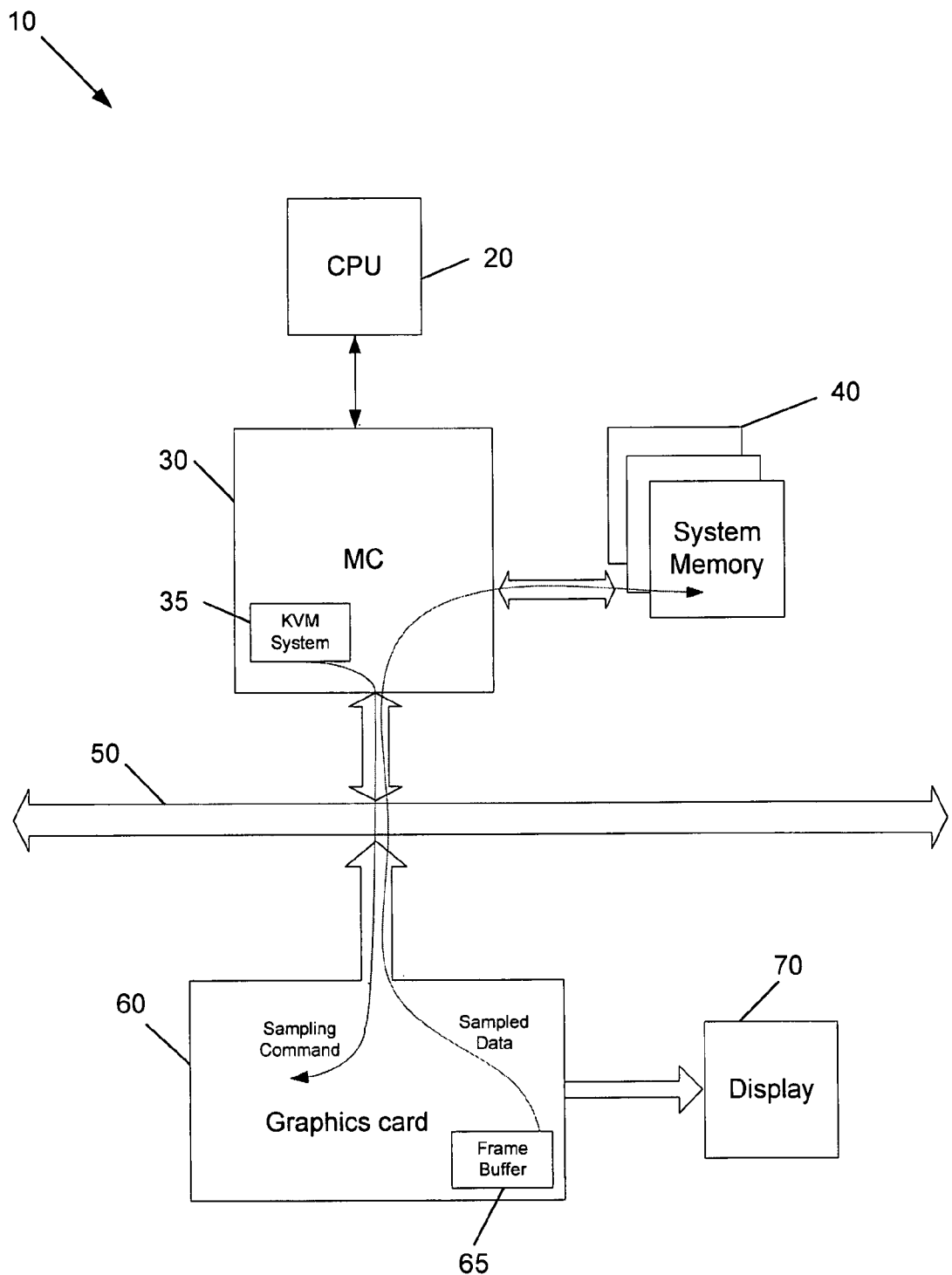
FIG. 1 is a block diagram of a system in accordance with an embodiment of the present invention.

Referring now to FIG. 1, shown is a block diagram of a system in accordance with an embodiment of the present invention. As shown in FIG. 1, system 10 which may be a processor-based system such as a personal computer (PC), server computer or other such system includes a processor 20, which may be a central processing unit (CPU) coupled to a memory controller (MC) 30. MC 30 includes a KVM system 35. KVM system 35 may include hardware, software, firmware or combinations thereof to enable KVM functionality. Specifically, KVM system 35 may include logic to control obtaining of keyboard, video and mouse data and provide the same for output from system 10, e.g., via a network connection. Further, KVM system 35 may enable the transmission of such KVM data for display on a display 70 of system 10 to the remote console. Note that system partitioning may vary, for example, the KVM system may be present in an input/output controller hub, inside processor 20, or elsewhere.

Referring still to FIG. 1, MC 30 is coupled to a system memory 40 which, in one embodiment may be double data rate (DDR) memory such as dynamic random access memory (DRAM) or another such memory. In some implementations, particularly where MC 30 is further integrated with graphics capabilities (i.e., a graphics and memory controller (GMC)), at least a portion of system memory 40 may act as so-called stolen memory to be used by the graphics of MC 30. Note that the KVM memory can also be another memory which is not part of system memory 40. Furthermore, frame buffers associated with KVM system 35 also may be present in this stolen memory, in some implementations. As further shown in FIG. 1, MC 30 is coupled to a bus 50, which may be a bus in accordance with a PCI or PCIe™ protocol in some embodiments. A graphics card 60 is also coupled to bus 50. In various embodiments, graphics card 60 may be an external graphics card that includes a frame buffer 65. In turn, graphics card 60 is coupled to display 70. The output of data to display 70 may be by analog data such as video graphics adapter (VGA) data or digital data such as in accordance with a digital visual interface (DVI) standard. While shown with this particular implementation in the embodiment of FIG. 1, the scope of the present invention is not limited in this regard.

In operation, a remote console may provide a request to KVM system 35 to open a KVM session. Responsive to such a request, KVM system 35 may determine the type of session to be opened, along with capabilities of system 10. For example, KVM system 35 may determine whether to provide a query to a user of system 10 to inquire whether the user desires opening of the KVM system. Such a request may be implemented by sending graphics data generated by KVM system 35 to graphics card 60 for output on display 70. However, in other systems, e.g., a server system in which no user is present, such an inquiry may be avoided. Furthermore, KVM system 35 may determine the type of KVM operations to be performed, such as retrieving data from graphics card 60 for processing and transmission back to the remote console, providing of data for display, or other operations.

To perform KVM operations such as requesting and receiving data to be provided to display 70, KVM system 35 may send a sampling command to graphics card 60 and more particularly to a controller or other processor of graphics card 60, or other control circuitry within graphics card 60. In turn, sampled data may be obtained from frame buffer 65 and written through a direct memory access (DMA) channel or through other protocol-based messages back to KVM system 35 using the existing interface through bus 50. Note that in the implementation of FIG. 1, the sampled data may be provided to a KVM buffer present in memory 40 either directly or indirectly using another unit that understands the messaging protocol being used. In alternate implementations, such buffer may be present in MC 30 or in another memory. In turn, KVM system 35 may process the data accordingly and provide it to a desired location, e.g., to be transmitted to a remote console via a network protocol such as a desired Ethernet, internet protocol (IP) or other such protocol.

Figure 2:
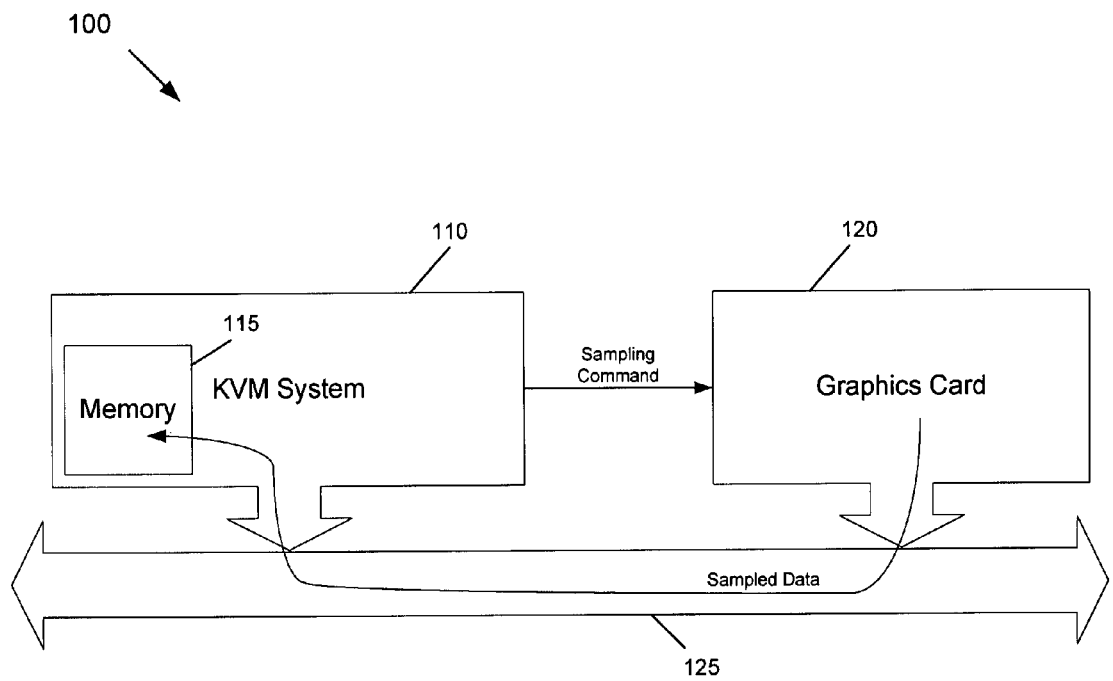
FIG. 2 is a block diagram of a portion of a system in accordance with another embodiment of the present invention.

In other embodiments, a dedicated KVM card may be provided. Referring now to FIG. 2, shown is a block diagram of a portion of a system in accordance with another embodiment of the present invention. As shown in FIG. 2, system 100 includes a KVM system 110, which may be a KVM card to control a graphics card 120. Note that both systems are coupled via a bus 125, which may be PCI bus. KVM system 110 may include various components, including a sampler, a compressor, A/D converter and other logic. Of course, via use of embodiments of the present invention, the presence of the A/D converter may be avoided. KVM system 110 further includes a memory 115 which may provide a buffer to receive sampled data from graphics card 120. In operation, a sampling command may be sent from KVM system 110 to graphics card 120, e.g., via an OOB channel or as a special command using the connecting bus (e.g., a PCIe™ bus). In turn, a DMA transfer of sampled data, e.g., from a frame buffer of graphics card 120 may be provided through the existing interface of PCI bus 125 to provide the data to memory 115. Of course other implementations are possible. For example, in other systems a graphics card may include KVM functionality to enable communication of graphics data to a remote system by implementation of KVM operations within the graphics card itself. In such a system, a microcontroller or other processor within the graphics card may provide a communication to a PCI or other bus to provide the data through to the system.

Figure 3:
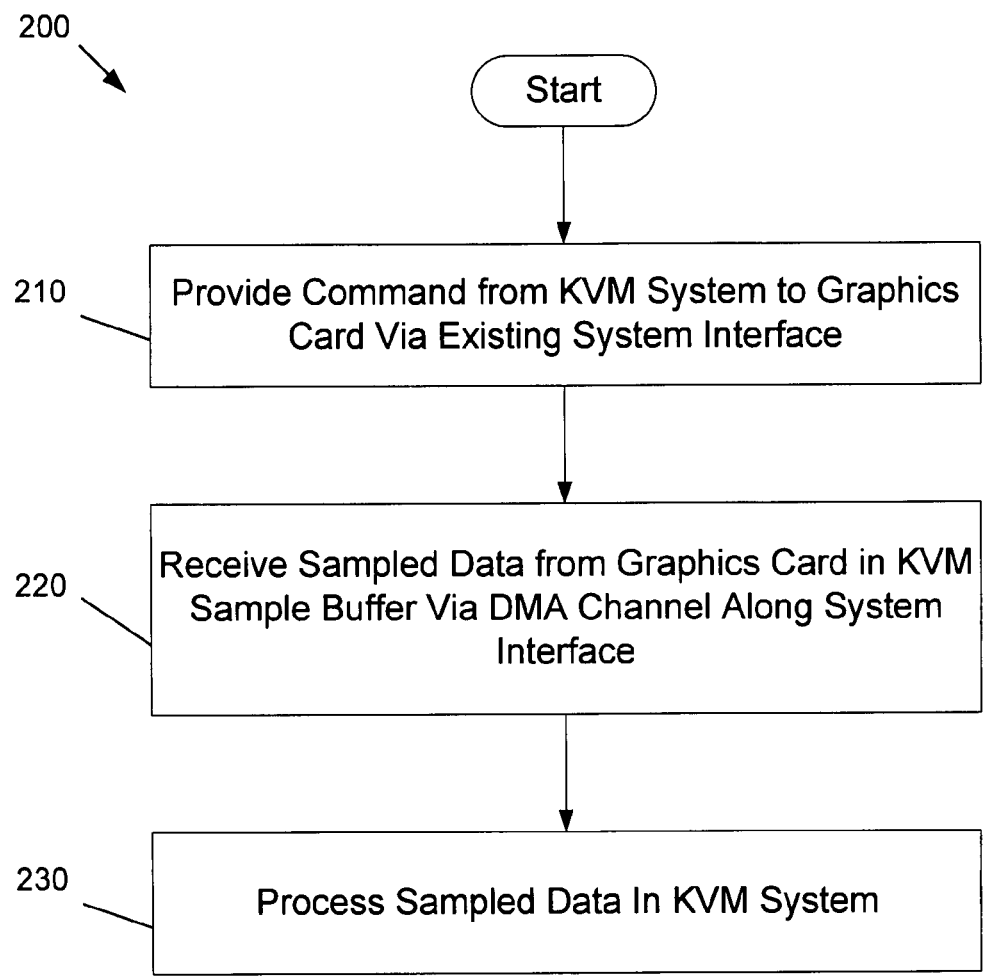
FIG. 3 is a flow diagram of a method in accordance with an embodiment of the present invention.

Referring now to FIG. 3, shown is a flow diagram of a method in accordance with an embodiment of the present invention. As shown in FIG. 3, method 200 may begin by providing a command from a KVM system to a graphics card via an existing system interface (block 210). For example, in some embodiments PCI, PCIe™ or system management bus (SMBus) commands may be provided through existing pins between the KVM system, which may be present in a GMC or other location to an external graphics card, e.g., by a PCI bus. Responsive to this command, different operations such as receipt or transmission of data may occur. For example, the graphics card may sample its data, e.g., in a frame buffer and provide it back to a sample buffer of the KVM system (block 220). More specifically, in some implementations the graphics card may sample its output frame buffer through PCIe™ or PCI bus master DMA transactions or using other OOB channels via bus specific messages and provide the information through the existing interface to the KVM sample buffer. In various implementations, this sample buffer may be present in the KVM system (e.g., in the GMC) or in system memory. Data generated by the KVM system to be displayed on the graphics card may be provided via the OOB channel to the graphics card for display. If data is provided to the KVM sample buffer, the KVM system may process the sampled data accordingly (block 230). For example, various operations may be performed on the sampled data by the KVM system. For example, the data may be compressed and then packetized and sent to a remote system, e.g., via a network interface for display on a display associated with the remote system. While shown with this particular implementation in the embodiment of FIG. 3, the scope of the present invention is not limited in this regard. For example, other commands may be used to write data to the output frame buffer of the graphics card for display on a local display coupled thereto. For example, during KVM operations, the KVM system may instruct the graphics card to provide information to the display, such as a user notification to indicate that data is being provided remotely in the KVM mode of operation. Still further, other communications via the existing interface between the KVM system and graphics card may be performed to obtain graphics or control capabilities and so forth.

When the KVM system needs a new sampled screen buffer, a new command may be sent by writing a physical address in the KVM sample buffer to a destination buffer physical address pointer register in the graphics card. Then the KVM system may send a sampling command to the graphics card. Note that in some embodiments, these two separate commands can be sent as a single command. In response thereto, a DMA controller within the graphics card may write a copy of the data in its output frame buffer to the pointed to address (i.e., the destination buffer physical address) via a PCIe™ bus or another such existing interface. Accordingly, embodiments enable implementation in a system without additional pins over what is present in a given graphics card (e.g., PCI, PCIe™ or advanced graphics protocol (AGP)). Furthermore, screen buffer information from the graphics card may be provided using bus master DMA cycles without the need for conversion of the information to analog signals, eliminating noise additions to the analog signals.

In other implementations, bus messages may be used as controls to the graphics card while the graphics card returns the sampled data using other bus messages (i.e., not using DMA accesses to platform specific addresses). Note that in some implementations, transactions may be performed using a defined protocol that carries the commands in well-formed messages. The graphics card in return does not push the data using DMA transfers, as a "malicious graphics card" can corrupt the host memory. Alternatively, other bus messages carry the different commands, responses and data. A specific hardware, software, or firmware at the KVM system side extracts the data from these messages and places it in the host memory (or in the KVM memory).

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system for communicating via a network with a remote console, the remote console being remote from the system, the system comprising:

logic to receive via the network at least one request from the remote console, the at least one request requesting opening of a keyboard, video, and mouse (KVM) redirection session, the logic, in response to the at least one request, being to determine a control capability of the logic and KVM redirection session type to be opened, the logic being to packetize and transmit, after the session is opened, the logic to send the KVM information to the remote console via the session via a network protocol, the KVM information being intended to be displayed at a local display and at a remote display of the remote console, the also being to command that a user notification be displayed at the local display, the user notification notifying that the KVM information is being provided to the remote console in a KVM mode of operation in the session.

2. The system of claim 1, wherein:
the logic is also to compress the KVM information prior to transmitting the KVM information via the session; and
the logic is also to request a user query as to whether to open the session.

3. The system of 1, wherein:
the logic is also to request user authentication prior to opening the KVM session.

4. The system of claim 1, wherein:
the logic comprises central processing unit (CPU) coupled to a memory controller (MC), the MC being coupled to system memory;
at least a portion of the system memory to be used by graphics capabilities of the MC; and
one of the CPU and the MC comprises a KVM system to receive the at least one request.

5. The system of claim 1, wherein:
the logic comprises a controller to control communication of the KVM information to the remote console, the controller being to send an out-of-band (GOB) command via a first bus; and
the logic also includes a graphics unit coupled to the controller by the first bus, the graphics unit including a frame buffer to store video data to be provided to the local display, wherein the graphics unit is to provide data from the frame buffer to a buffer associated with the controller responsive to the OOB command via the first bus.

6. Computer-readable memory storing instructions that when executed by a machine result in operations comprising:
receiving via a network by logic at least one request from a remote console, the remote console being remote from the logic, the at least one request requesting opening of a keyboard, video, and mouse (KVM) redirection session, the logic in response to the at least one request, being to determine a control capability of the logic and KVM redirection session type to be opened, the logic being to packetize and transmit, after the session is opened, KVM information to the remote console via the session via a network protocol, the KVM information being intended to be displayed at a local and at a remote display of the remote console, the logic also being to command that a user notification be displayed at the local display, the user notification notifying that the KVM information is being provided to the remote console in a KVM mode of operation in the session.

7. The memory of claim 6, wherein:
the logic is also to compress the KVM information prior to transmitting the KVM information via the session; and
the logic is also to request a user query as to whether to open the session.

8. The memory of claim 6, wherein:
the logic is also to request user authentication prior to opening the KVM session.

9. The memory of claim 6, wherein:
the logic comprises central processing unit (CPU) coupled to a memory controller (MC), the MC being coupled to system memory;
at least a portion of the system memory is to be used by graphics capabilities of the MC; and
one of the CPU and the MC comprises a KVM system to receive the at least one request.

10. The memory of claim 6, wherein:
the logic comprises a controller to control communication of the KVM information to the remote console, the controller being to send an out-of-band (GOB) command via a first bus; and
the logic also includes a graphics unit coupled to the controller by the first bus, the graphics unit including a frame buffer to store video data to be provided to the local display, wherein the graphics unit is to provide data from the frame buffer to a buffer associated with the controller responsive to the OOB command via the first bus.

11. A method comprising for communicating via a network with a remote console, the remote console being remote from the system comprising:
receiving via the network by logic at least one request from the remote console, the at least one request requesting opening of a keyboard, video, and mouse (KVM) redirection session, the logic, in response to the at least one request, being to determine a control capability of the and KVM redirection session type to be opened, the logic being to packetize and transmit, after the session is opened, KVM information to the remote console via the session via a network protocol, the KVM information being intended to be displayed at a local display and at a remote display of the remote console, the logic also being to command that a user notification be displayed at the local display, the user notification notifying that the KVM information is being provided to the remote console in a KVM mode of operation in the session.

12. The method of claim 11, wherein:
the logic is also to compress the KVM information prior to transmitting the KVM information via the session; and
the logic is also to request a user query as to whether to open the session.

13. The method of claim 11, wherein:
the logic is also to request user authentication prior to opening the KVM session.

14. The method of claim 11, wherein:
the logic comprises central processing unit (CPU) coupled to a memory controller (MC), the MC being coupled to system memory;
at least a portion of the system memory is to be used by graphics capabilities of the MC; and
one of the CPU and the MC comprises a KVM system to receive the at least one request.

15. The method of claim 11, wherein:
the logic comprises a controller to control communication of the KVM information to the remote console, the controller being to send an out-of-band (GOB) command via a first bus; and
the logic also includes a graphics unit coupled to the controller by the first bus, the graphics unit including a frame buffer to store video data to be provided to the local display, wherein the graphics unit is to provide data from the frame buffer to a buffer associated with the controller responsive to the OOB command via the first bus.

* * * * *